US012397595B2

(12) United States Patent
Hann et al.

(10) Patent No.: US 12,397,595 B2
(45) Date of Patent: Aug. 26, 2025

(54) TRAILER HITCH ASSEMBLIES AND METHODS THEREFOR

(71) Applicant: Hann Hitch Company, LLC, Wabash, IN (US)

(72) Inventors: Samuel C. Hann, Wabash, IN (US); Amanda F. Hann, Wabash, IN (US)

(73) Assignee: Hann Hitch Company, LLC, Wabash, IN (US)

( * ) Notice: Subject to any disclaimer, the term of this patent is extended or adjusted under 35 U.S.C. 154(b) by 526 days.

(21) Appl. No.: 18/045,200

(22) Filed: Oct. 10, 2022

(65) Prior Publication Data

US 2023/0150320 A1 May 18, 2023

Related U.S. Application Data

(60) Provisional application No. 63/253,638, filed on Oct. 8, 2021.

(51) Int. Cl.
*B60D 1/06* (2006.01)
*B60D 1/52* (2006.01)

(52) U.S. Cl.
CPC ............. *B60D 1/06* (2013.01); *B60D 1/52* (2013.01)

(58) Field of Classification Search
CPC .......... B60D 1/06; B60D 1/065; B60D 1/052
See application file for complete search history.

(56) References Cited

U.S. PATENT DOCUMENTS

| 4,060,331 | A | * | 11/1977 | Domer | B60D 1/06 280/511 |
| 6,908,098 | B2 | * | 6/2005 | Milazzo | B60D 1/06 280/511 |
| 7,661,694 | B2 | * | 2/2010 | Krespach | B60D 1/06 280/511 |
| 2005/0001408 | A1 | * | 1/2005 | Irgens | B60D 1/52 280/511 |
| 2009/0026730 | A1 | * | 1/2009 | Frantz | B60D 1/06 280/511 |

* cited by examiner

*Primary Examiner* — Jacob S. Scott
(74) *Attorney, Agent, or Firm* — Hartman Global IP Law; Gary M. Hartman; Domenica N.S. Hartman

(57) ABSTRACT

Trailer hitch assemblies and methods therefor. A trailer hitch assembly includes a mounting connection with a bore configured to receive the elongated stem of a trailer coupling device, in which one or more protuberances on the inner surface of the bore of the mounting connection interact with complementary recesses in the trailer coupling device to prevent the elongated stem from rotating axially within the bore of the mounting connection. A fastener can be inserted through aligned holes through the mounting connection and the elongated stem to secure the trailer coupling device relative to the mounting connection. The mounting connection may be an integral feature of a trailer coupling device, or the mounting connection may be separate from the trailer coupling device.

20 Claims, 7 Drawing Sheets

TRAILER HITCH ASSEMBLIES AND METHODS THEREFOR

CROSS-REFERENCE TO RELATED APPLICATIONS

This application claims the benefit of U.S. Provisional Application No. 63/253,638, filed Oct. 8, 2021, the contents of which are incorporated herein by reference.

BACKGROUND OF THE INVENTION

The present invention generally relates to trailer hitch accessories. The invention particularly relates to trailer hitch assemblies having a mounting connection and a trailer coupling device that cooperate to reduce the likelihood of decoupling during towing while also allowing for more rapid, efficient and safe replacement of the trailer coupling device.

Trailer hitches serve as connectors between a tow vehicle and a trailer. Receiver type trailer hitches generally include a structural component fixed to the tow vehicle chassis that includes a receiver tube that has a rearward facing opening capable of accepting various hitch mounted components therein, such as trailer hitch ball mounts, hitch bike racks, cargo carriers, etc.

FIG. 1 represents a trailer hitch assembly having a common type of trailer hitch mount device (ball mount) 10 that may be releasably coupled to a trailer coupler (hitch) mounted to the tongue of a trailer. The mount device 10 includes a rectangular shank 12 having oppositely-disposed ends and a platform 14 extending from one of the ends. The end of the shank 12 opposite the platform 14 is configured to be inserted into the receiver tube of the trailer hitch such that a pair of holes 16 of the shank 12 align with corresponding holes of the receiver tube of the vehicle. The shank 12 may then be releasably coupled to the receiving tube by inserting a trailer hitch pin 36 through the holes 16 of the shank 12 and the aligned holes of the receiving tube until a distal end of the trailer hitch pin 36 exits an opposite side of the receiving tube. The trailer hitch pin 36 may then be secured with a fastener such as a cotter pin 38 that may be inserted into a hole 40 of the trailer hitch pin 36.

The platform 14 provides a mounting connection for a trailer coupling device (trailer ball) 20. In this example, the mounting connection of the platform is a through hole 18. The trailer coupling device 20 includes a spherical body (ball) 22 and a stem extending therefrom. The ball 22 can be any one of a variety of sizes as required to receive a particular sized trailer coupler mounted to a tongue of a trailer. The stem includes an upper stem portion 24, a circumferential flange 26, and a lower stem portion 28. The trailer coupling device 20 may be coupled to the mount device 10 by inserting the lower stem portion 28 through the hole 18 of the platform 14 such that the circumferential flange 26 rests on the platform 14 and the lower stem portion 28 extends from an opposite surface of the platform 14 (e.g., the bottom). The lower stem portion 28 can then be secured with a split lock washer 32 and a threaded nut 34 configured to be threadably coupled with threads 30 on the exterior surface of the lower stem portion 28. Once the mount device 10 is secured to the tow vehicle by adequately torquing the nut 34, the trailer coupler can be placed on and secured to the ball 22 of the trailer coupling device 20. This arrangement allows the trailer to swivel and articulate relative to the tow vehicle.

While trailer hitch ball mounts have found continuous and widespread adoption, they are not without shortcomings. For example, during transportation of the trailer, the trailer coupler applies significant radial and rotational forces to the trailer coupling device 20 through its connection with the ball 22. In addition, the trailer coupling device 20 may experience impact forces and/or vibrations associated with road travel. Over time, these forces may cause the nut 34 and washer 32 to loosen and potentially become decoupled from the lower stem portion 28. In addition to potentially losing components of the mount device 10, if the trailer coupling device 20 becomes loose while the tow vehicle is pulling the trailer, for example, on a roadway, significant damage may occur to the tow vehicle, the trailer, and/or other surrounding objects. Consequently, the nut 34 must be torqued to a high torque specification, as examples, about 150 to about 250 ft-lbs. (depending on the size of the lower stem 28) to inhibit its loosening. As such, current trailer hitch ball mounts on the market often require large wrenches and in many cases a lubricant, considerable force, and several hours to interchange trailer coupling devices 20, for example, to replace the trailer coupling device 20 with a different trailer coupling device 20 having a larger or smaller ball 22. In extreme cases, it may be virtually impossible to replace a trailer coupling device 20 from its mounting device 10.

In view of the above, it can be appreciated that there are certain problems, shortcomings or disadvantages associated with the prior art, and that it would be desirable if a trailer hitch ball mount was available that was capable of at least partly overcoming or avoiding the problems, shortcomings or disadvantages noted above, including the time, efficiency, and simplicity of interchanging trailer balls.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides trailer hitch mount devices and methods suitable for securing trailers to tow vehicles.

According to one aspect of the invention, a trailer hitch assembly is provided that includes a trailer hitch mount device have a frame configured to be secured to a tow vehicle, a mounting connection associated with the frame that includes a body with a bore therethrough having a central, longitudinal axis, at least one opening to the bore at an end of the body, a pair of aligned holes on opposite sides of the body, and one or more protuberances that protrude from interior surfaces of the body into the bore and extend within the bore in a direction parallel to the longitudinal axis of the bore, and a trailer coupling device configured to be secured to a trailer that includes an elongated stem having one or more recesses formed in exterior surfaces thereof that extend along the elongated stem in a direction parallel to the longitudinal axis of the elongated stem, and a hole through a diameter of the elongated stem having openings on opposite sides thereof. The elongated stem is configured to be received within the bore of the mounting connection such that the one or more protuberances of the mounting connection are aligned with and received within the one or more recesses of the elongated stem and the holes of the mounting connection are aligned with the hole in the stem. The trailer hitch mount device includes a fastener configured to be inserted into a first of the holes of the mounting connection, through the hole of the elongated stem, and out of a second of the holes of the mounting connection while the elongated stem is received in the bore to secure the trailer coupling device relative to the mounting connection in a direction parallel to the longitudinal axis of the bore. The one or more protuberances of the mounting connection act as barriers on the recesses of the elongated stem and thereby prevent the elongated stem from rotating within the bore of the mounting connection about the longitudinal axis thereof.

According to another aspect of the invention, a method is provided for coupling a trailer to a tow vehicle. The method includes securing a frame of a trailer hitch mount device to the tow vehicle, aligning a central, longitudinal axis of an elongated stem of a trailer coupling device with a central, longitudinal axis of a bore of a mounting connection associated with the frame, aligning one or more protuberances that protrude from interior surfaces of the mounting connection into the bore with one or more recesses formed in exterior surfaces of the elongated stem, inserting the elongated stem of the trailer coupling device into an opening to the bore of the mounting connection such that the one or more protuberances of the mounting connection are received within the one or more recesses of the elongated stem, continuing to insert the elongated stem into the bore until a hole through a diameter of the elongated stem having openings on opposite sides thereof is aligned with a pair of aligned holes on opposite sides of the mounting connection, inserting a fastener into a first of the holes of the mounting connection, through the hole of the elongated stem, and out of a second of the holes of the mounting connection, coupling a trailer to the trailer coupling device, and restricting rotation of the elongated stem within the bore by contacting surfaces of the elongated stem that define the one or more recesses with the one or more protuberances of the mounting connection.

Technical effects of trailer hitch assemblies, trailer hitch mount devices, and methods described herein may include the ability to secure the trailer coupling device to the frame of the trailer hitch mount device without using threaded connections that may become decoupled during use.

These and other aspects, arrangements, features, and/or technical effects will become apparent upon detailed inspection of the figures and the following description.

DETAILED DESCRIPTION OF THE INVENTION

Figure 1:
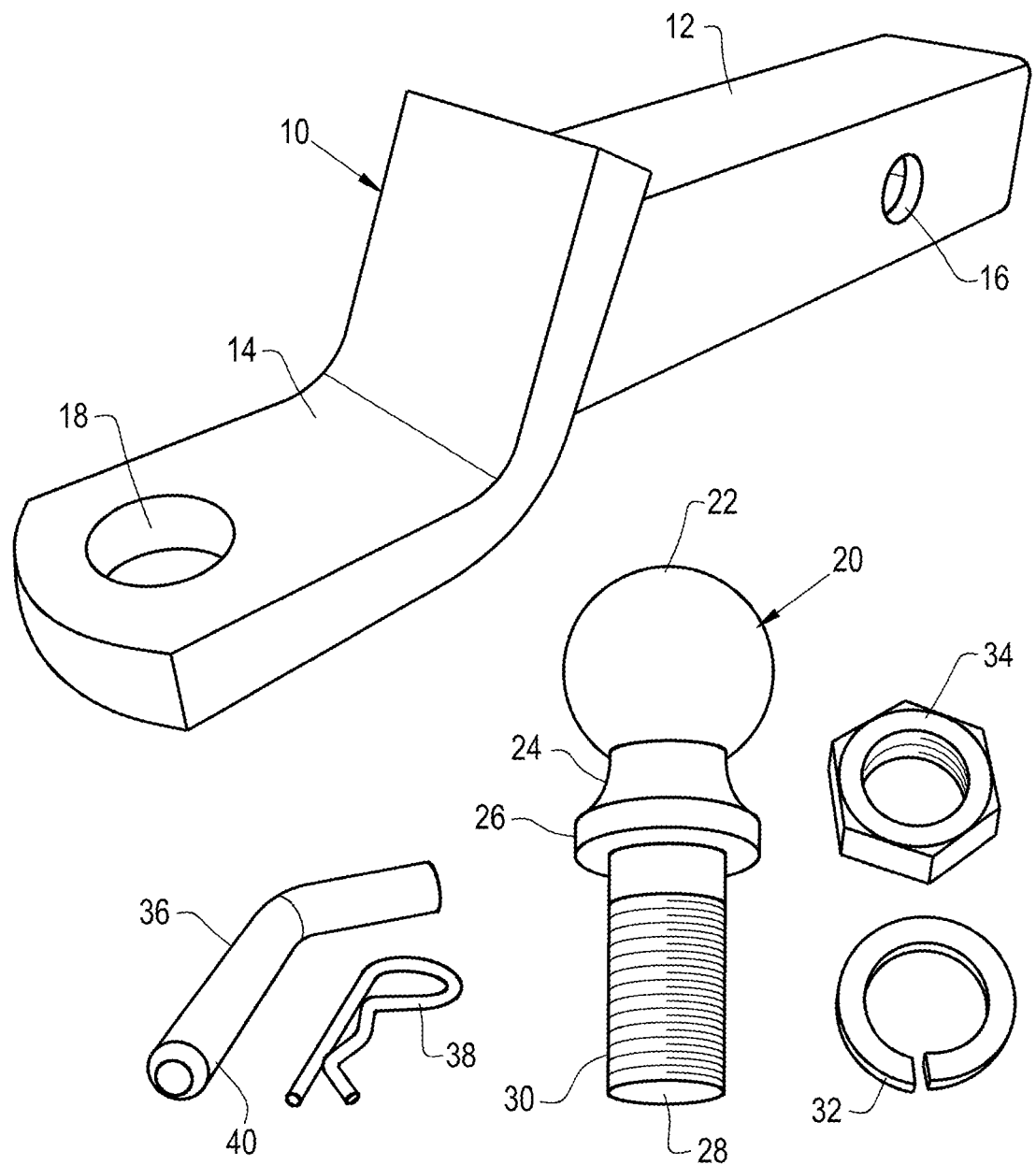
FIG. 1 contains perspective views of components of a trailer hitch assembly with a conventional trailer hitch mount device for securing a trailer to a tow vehicle.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

To facilitate the description provided below of the embodiment(s) represented in the drawings, relative terms, including but not limited to, "proximal," "distal," "anterior," "posterior," "vertical," "horizontal," "lateral," "front," "rear," "side," "forward," "rearward," "top," "bottom," "upper," "lower," "above," "below," "right," "left," etc., may be used in reference to the orientation of the mounting connections and coupling devices during use and/or as represented in the drawings. All such relative terms are useful to describe the illustrated embodiment(s) but should not be otherwise interpreted as limiting the scope of the invention.

Disclosed herein are trailer hitch assemblies including mounting connections 118 and trailer coupling devices (e.g., trailer balls) 120 that are adapted for use in combination with trailer hitch mount devices (ball mounts), including but not limited to the mount device 10 of FIG. 1, for coupling trailers to tow vehicles. The mounting connections 118 and trailer coupling devices 120 replace the threaded connections of certain conventional trailer hitch mount devices, such as that of the conventional mount device 10 represented in FIG. 1, which may loosen and/or become lost during transportation of the trailer with the tow vehicle. The mounting connections 118 and trailer coupling devices 120 includes one or more complementary features, represented as protuberances 146 and corresponding recesses(s) 152, that interlock to restrict rotational motion of a connection point between the trailer and the tow vehicle. The mounting connections 118 and trailer coupling devices 120 may also include a pin-type fastener for restricting their vertical motion relative to the trailer and tow vehicle.

Figure 2:
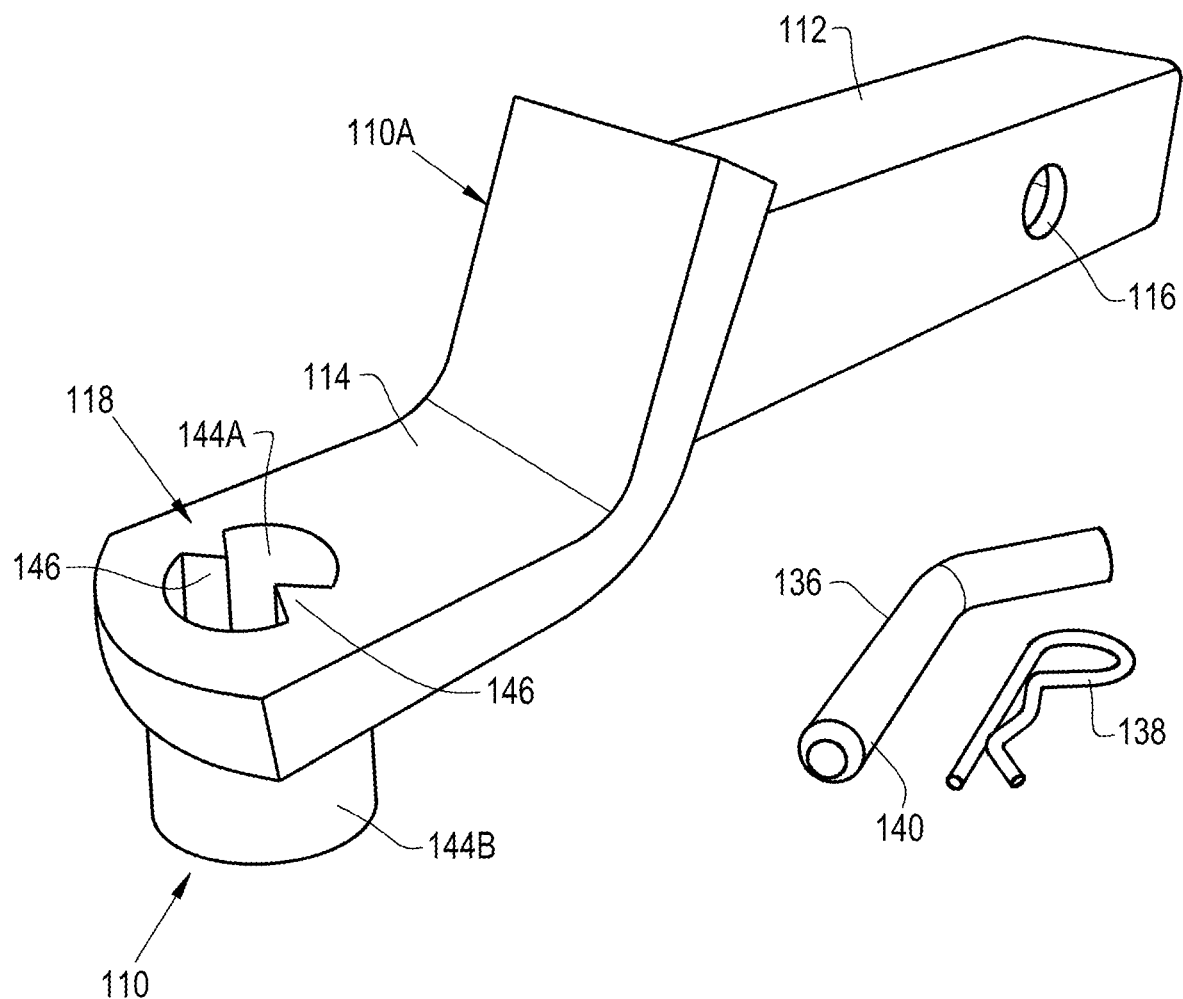
FIG. 2 is a perspective view of a trailer hitch assembly with a trailer hitch mount device for securing a trailer to a tow vehicle in accordance with a first nonlimiting embodiment of the invention.
Figure 3:
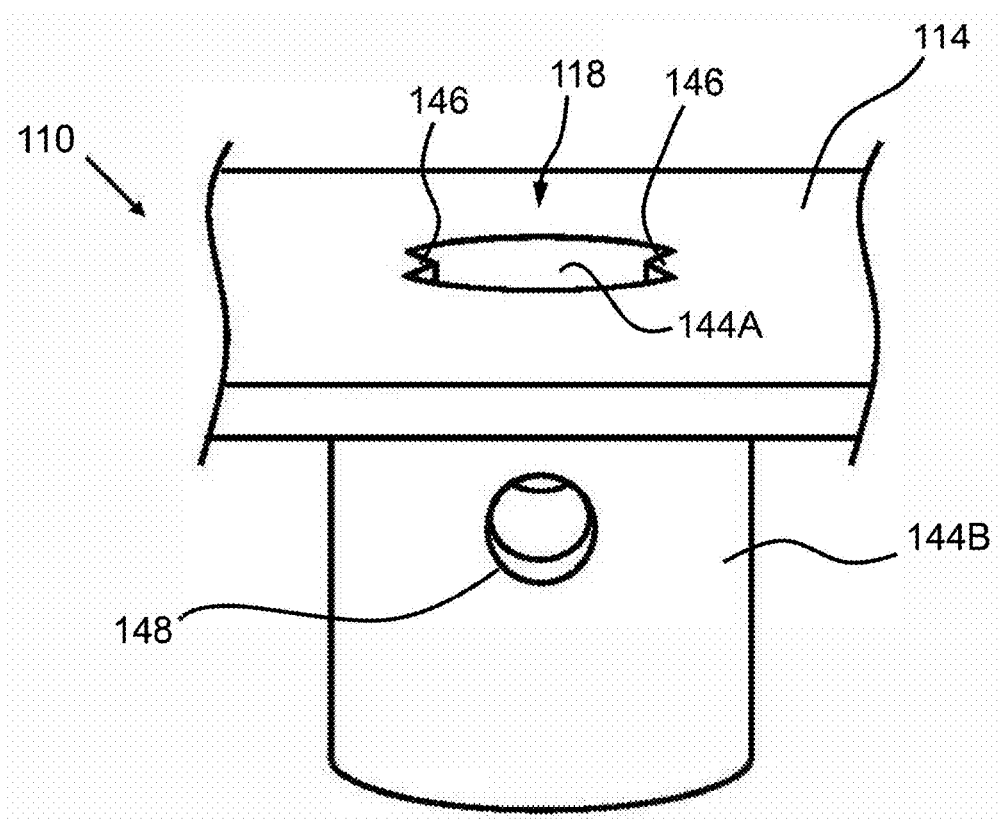
FIG. 3 is an enlarged perspective view of a mounting connection of the mount device of FIG. 2.
Figure 4:
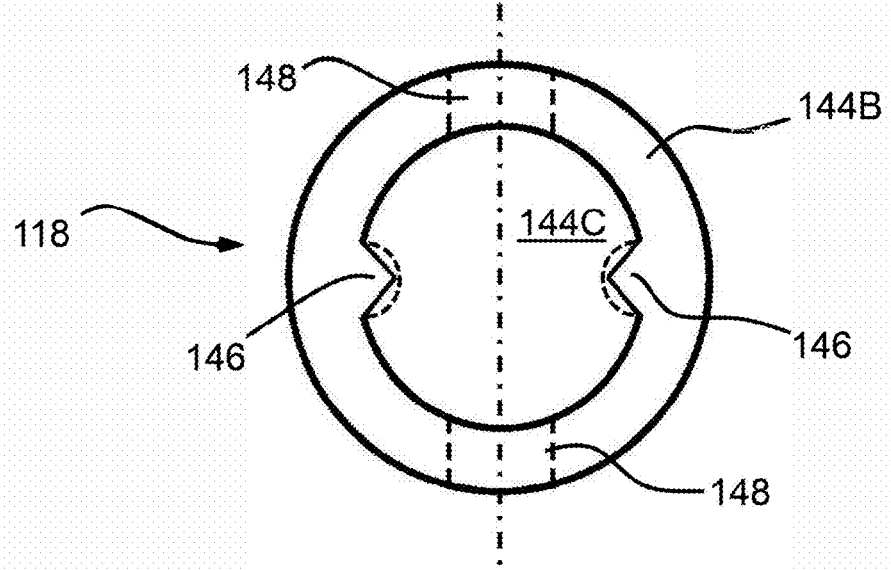
FIG. 4 is a bottom end view of a cylindrical body of the mounting connection of FIG. 3.
Figure 5:
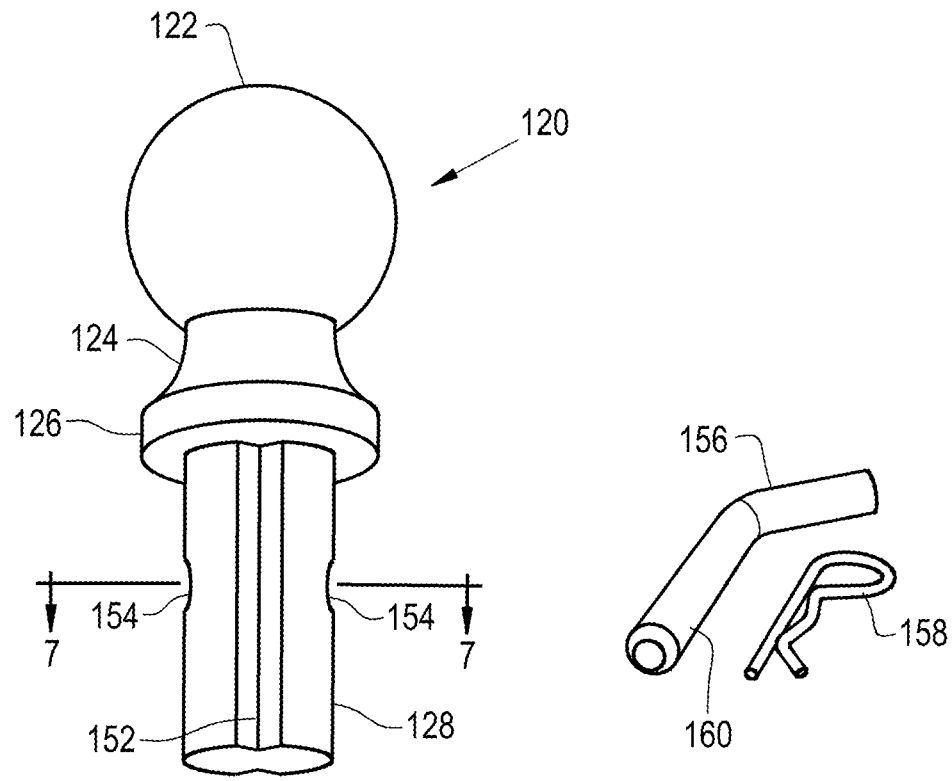
FIG. 5 is a perspective view of a trailer coupling device suitable for use with the mount device of FIG. 2 in accordance with certain nonlimiting aspects of the invention.
Figure 6:
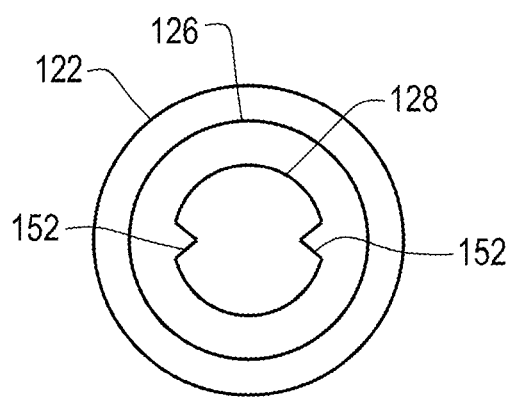
FIG. 6 is a bottom end view of the trailer coupling device of FIG. 5.
Figure 7:
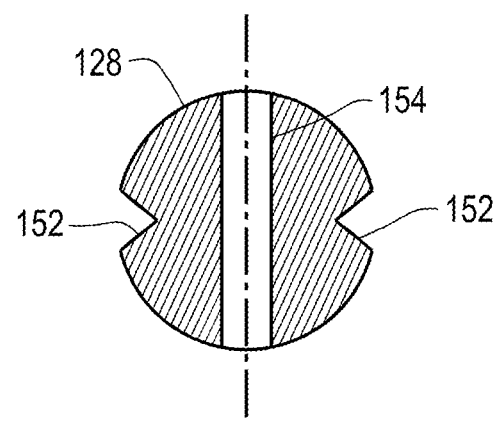
FIG. 7 is a transverse cross-sectional view of a lower stem portion of the trailer coupling device generally along lines 7-7 of FIG. 5.

FIGS. 2 through 4 illustrate a trailer hitch assembly including a first embodiment of the mounting connections 118, FIGS. 8 through 11 illustrate a trailer hitch assembly with alternative embodiments of the mounting connections 118, and FIGS. 5 through 7 illustrate the trailer coupling device 120 adapted for use with trailer hitch assemblies including each of the illustrated embodiments of mounting connections 118. Referring initially to FIGS. 2 through 4, a trailer hitch mount device 110 is shown that is similar to the mount device 10 of FIG. 1 except for integrally incorporating the mounting connection 118 of the first embodiment. The mount device 110 includes a frame having a shank 112 configured to be coupled to a receiver type trailer hitch. The shank 112 has oppositely-disposed ends, with a platform 114 extending from one of the ends. The end of the shank 112 opposite the platform 114 is configured to be inserted into the receiver tube of a trailer hitch such that a pair of holes 116 of the shank 112 can be aligned with corresponding holes of the receiver tube. The shank 112 may then be releasably coupled to the receiving tube by inserting a trailer hitch pin 136 through the holes 116 of the shank 112 and the aligned holes of the receiving tube until a distal end of the trailer hitch pin 136 exits an opposite side of the receiving tube. The trailer hitch pin 136 may then be secured with a fastener such as a cotter pin 138 that may be inserted into a hole 140 of the trailer hitch pin 136.

In FIG. 2, the mounting connection 118 includes an opening 144A in the upper surface of the platform 114 and a cylindrical body 144B extending downward from the lower surface of the platform 114. In this embodiment, the cylindrical body 144B is fixed to the platform 114 in any suitable manner. Together, the opening 144A and cylindrical body 144B define an elongated cavity (bore) 144C (FIG. 4) that extends entirely through the platform 114 and cylindrical body 144B, from the upper surface of the platform 114 and through the lower end of the cylindrical body 144B. The opening 144A and bore 144C are represented as sharing a central, longitudinal axis.

The cylindrical body 144B in FIGS. 2 and 3 is an integral feature of the platform 114 as a result of the cylindrical body 144B being machined, cast, or otherwise formed as part of the platform 114. Alternatively, the cylindrical body 144B could be separately fabricated and then assembled with or attached to the platform 14 of FIG. 1 or a modification thereof, as discussed below in reference to FIGS. 8 through 11.

In FIG. 2, the cylindrical body 144B is centrally located in the platform 114 in relation to the width of the platform 14 and located adjacent a distal end of the platform 114 relative to the shank 112, though it is foreseeable that the cylindrical body 144B could be attached to the distal end or to a side of the platform 114. Also, though the cylindrical body 144B in this example extends only from the lower surface of the platform 114, the cylindrical body 144B could extend through the platform 114 such that portions of the cylindrical body 144B extend from one or both upper and lower surfaces of the platform 114.

A pair of protuberances 146 extend from interior surfaces of the opening 144A and cylindrical body 144B to project radially inward into the bore 144C. In this nonlimiting embodiment, the protuberances 146 define continuous elongated rails or ribs, each having a V-shaped cross-section and extending along the entire length of the bore 144C within the body 144B and in a direction parallel to the longitudinal axis of the bore 144C. FIG. 4 illustrates in phantom an alternative shape of the protuberances 146 as being arcuate in shape. Further alternatives include the mounting connection 118 having fewer or more protuberances 146, protuberances 146 that are not continuous along their lengths or otherwise do not extend along an entire length of the bore 144C, and/or protuberances 146 that have different cross-sectional shapes from each other.

Figure 11:
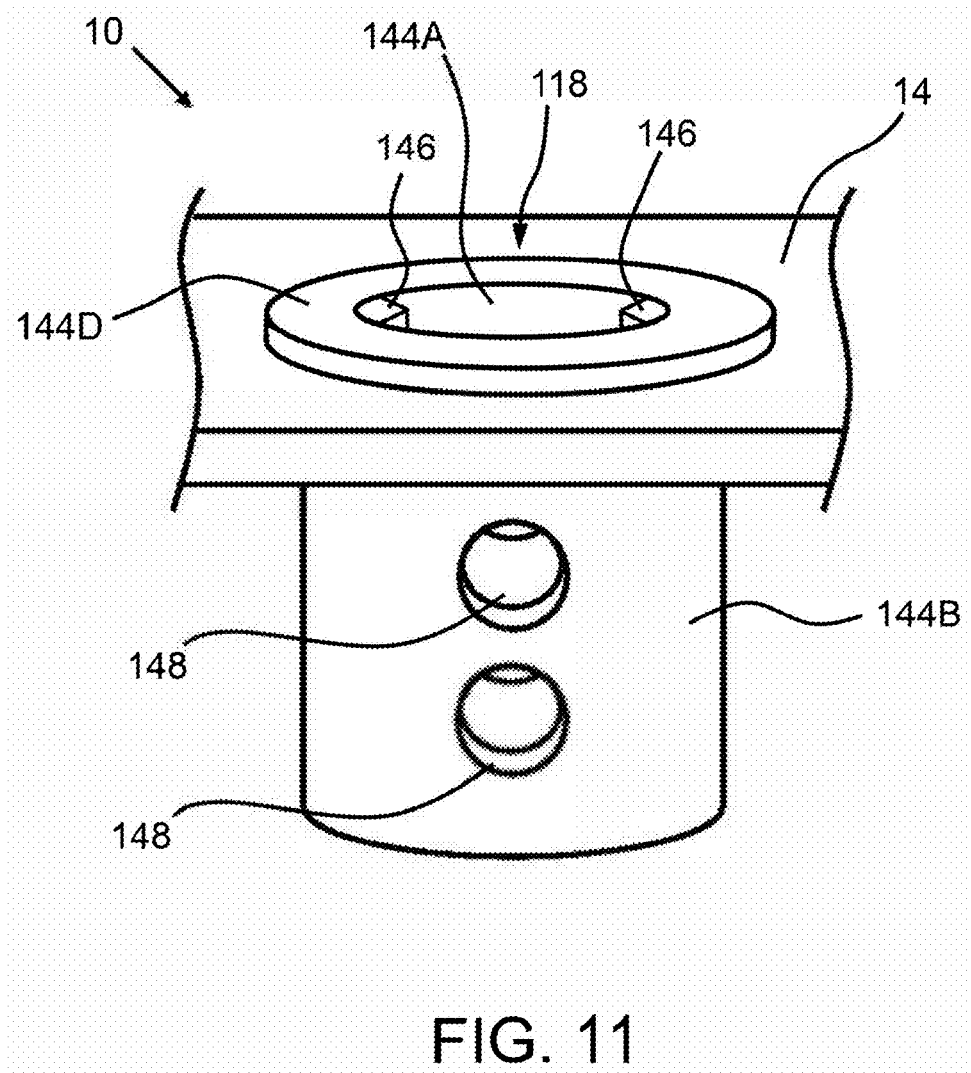
FIG. 11 is a perspective view of another alternative mounting connection to the mounting connection of FIGS. 2 through 4 in accordance with yet an additional nonlimiting embodiment of the invention.

As best seen in FIGS. 3 and 4, a single pair of aligned holes 148 are formed on opposite sides of the cylindrical body 144B. Although not required, in this embodiment the holes 148 have a common central axis that is perpendicular to a geometric line between the pair of protuberances 146. In the embodiment of FIG. 11, more than one pair of aligned holes 148 are provided, one pair above the other, so that the length of the cylindrical body 144B can be sized to accommodate platforms 14 or 114 of different thicknesses, for example, a 1-inch thick hitch on a dump truck or a ½-inch thick hitch on a smaller vehicle, to promote the universality of the mounting connection 118.

Referring now to FIGS. 5 through 7, the trailer coupling device 120 (e.g., a trailer ball) is represented as configured to be secured to the mounting connection 118 of the platform 114 and function as the connection between the mounting device 110 and a trailer. The trailer coupling device 120 includes a spherical body (ball) 122 configured to mate with a trailer coupler on a trailer tongue of a trailer. As with the ball 22 of FIG. 1, the ball 122 can be any one of a variety of sizes that may be required to receive a particular trailer coupler mounted to a trailer tongue. In the nonlimiting embodiment shown, an elongated stem extending from the ball 122 includes an upper stem portion 124 adjacent the ball 122, a circumferential flange 126 adjacent the upper stem portion 124, and a lower stem portion 128 extending from the circumferential flange 126.

The lower stem portion 128 is sized and configured to be received within the bore 144C of the mounting connection 118 to secure the trailer coupling device 120 to the mounting device 110. Therefore, since in this embodiment the bore 144C is cylindrical except for the protuberances 146, the lower stem portion 128 of the trailer coupling device 120 may also be cylindrical with the exception of recesses 152 formed in exterior surfaces thereof and configured to receive the protuberances 146 of the mounting connection 118. The cross-sectional shapes of the recesses 152 are preferably complementary to the protuberances 146, in this case, as a result of defining valleys having V shaped cross sections extending along the exterior surfaces of the lower stem portion 128 parallel to a central, longitudinal axis of the elongated stem. Alternatively, the lower stem portion 128 may include fewer or more recesses 152, may have recesses 152 that do not extend along an entirety of the bore 144C, may have recesses 152 having other cross-sectional shapes, and/or may have recesses 152 with different cross-sectional shapes. The sizes and shapes of the recesses 152 are only limited by the size and shapes of the corresponding protuberances 146 of the mounting connection 118 that must be receivable within the recesses 152.

The lower stem portion 128 may also include a hole 154 through a diameter thereof having openings on opposite sides thereof. In certain embodiments, the lower stem portion 128 is configured to be located within the bore 144C to an extent such that the circumferential flange 126 rests on the platform 114. In such embodiments, inserting the lower stem portion 128 through the bore 144C to the extent that the circumferential flange 126 contacts the platform 114 causes the hole 154 of the lower stem portion 128 and the pair of holes 148 of the mounting connection 118 to be axially aligned along a single axis.

In the arrangement of FIGS. 3 through 7, the central, longitudinal axes of the holes 148 of the mounting connection 118 are perpendicular to a geometric line or plane extending between the two protuberances 146, and a central, longitudinal axis of the hole 154 of the lower stem portion 128 is perpendicular to a geometric line or plane extending between the two recesses 152. It should be understood that this arrangement is merely exemplary, and the relative positions of the holes 148 of the mounting connection 118 and the protuberances 146, and the hole 154 of the lower stem portion 128 and the recesses 152 may have other arrangements. However, regardless of the specific arrangement between these elements, the holes 148 of the mounting connection 118 and the hole 154 of the lower stem portion 128 should be capable of aligning when the lower stem portion 128 is received within the bore 144C and the protuberances 146 are received within the recesses 152.

Once the lower stem portion 128 has been received within the bore 144C and the holes 148 of the mounting connection 118 and the hole 154 of the lower stem portion 128 are aligned, a fastener may be inserted into one of the holes 148 of the mounting connection 118, through the hole 154 of the elongated stem, and out through the other paired hole 148 of the mounting connection 118. For example, FIG. 5 represents the trailer coupling device 120 as including a trailer ball pin 156 (e.g., a trailer hitch pin or miniature trailer hitch pin) configured to be received within the holes 148 of the mounting connection 118 and the hole 154 of the lower stem portion 128 and secured by inserting a secondary fastener, such as a cotter pin 158, through a hole 160 in the trailer ball pin 156.

With the trailer coupling device 120 assembled with the mounting connection 118 as described above, the protuberances 146 of the mounting connection 118 may contact surfaces of the lower stem portion 128 that define the recesses 152 and act as barriers that restrict if not prevent rotation of the trailer coupling device 120 within the bore 144C of the mounting connection 118 about the longitudinal axis thereof. In addition, the trailer ball pin 156 may contact edges of the holes 148 of the mounting connection 118 and act as a barrier that restricts movement of the trailer coupling device 120 within the bore 144C in a direction parallel to the longitudinal axis of the bore 144C.

Figure 8:
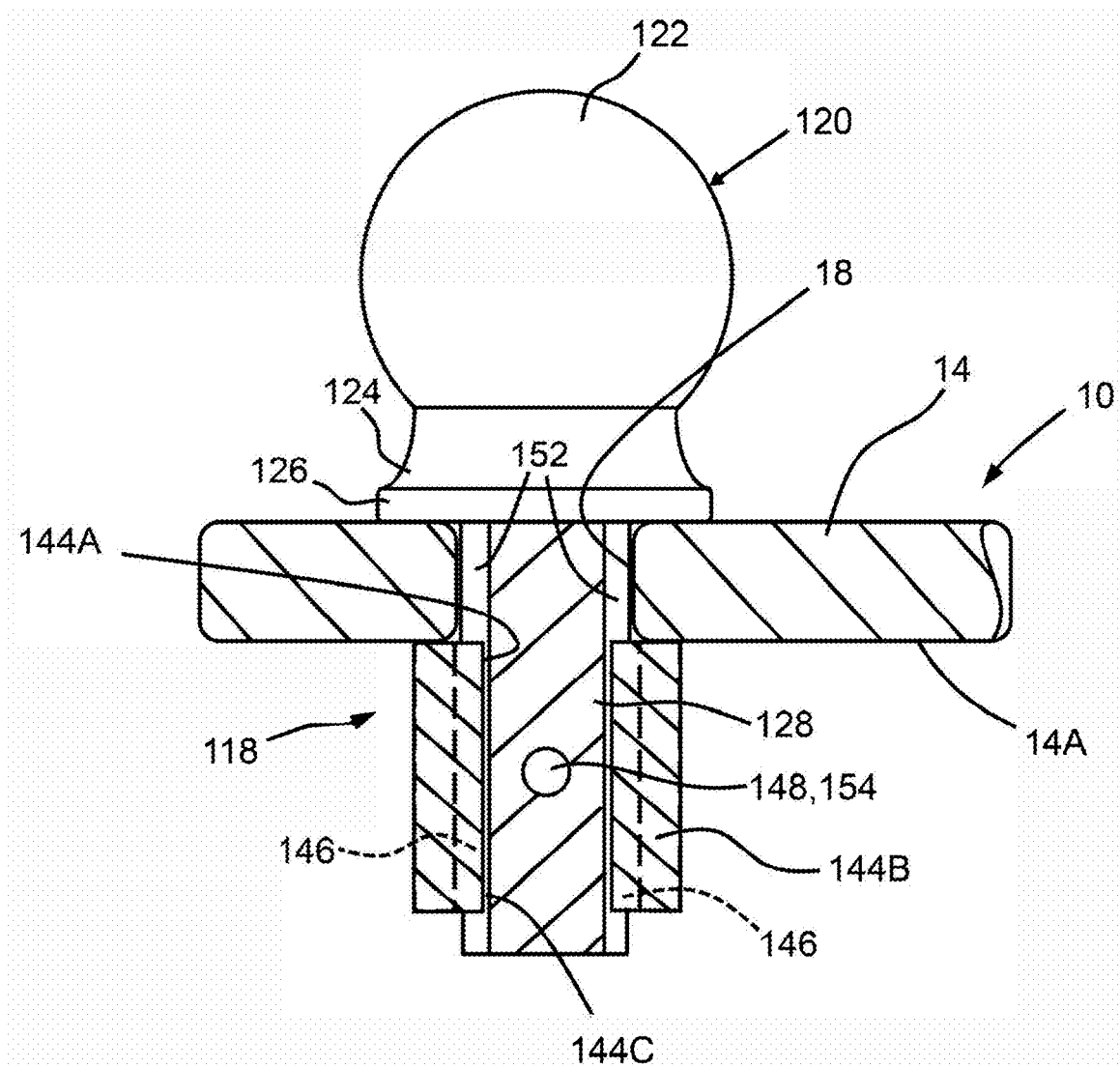
FIG. 8 is an enlarged partial cross-sectional view of a trailer hitch assembly with an alternative mounting connection to the mounting connection of FIGS. 2 through 4 in accordance with an additional nonlimiting embodiment of the invention.
Figure 9:
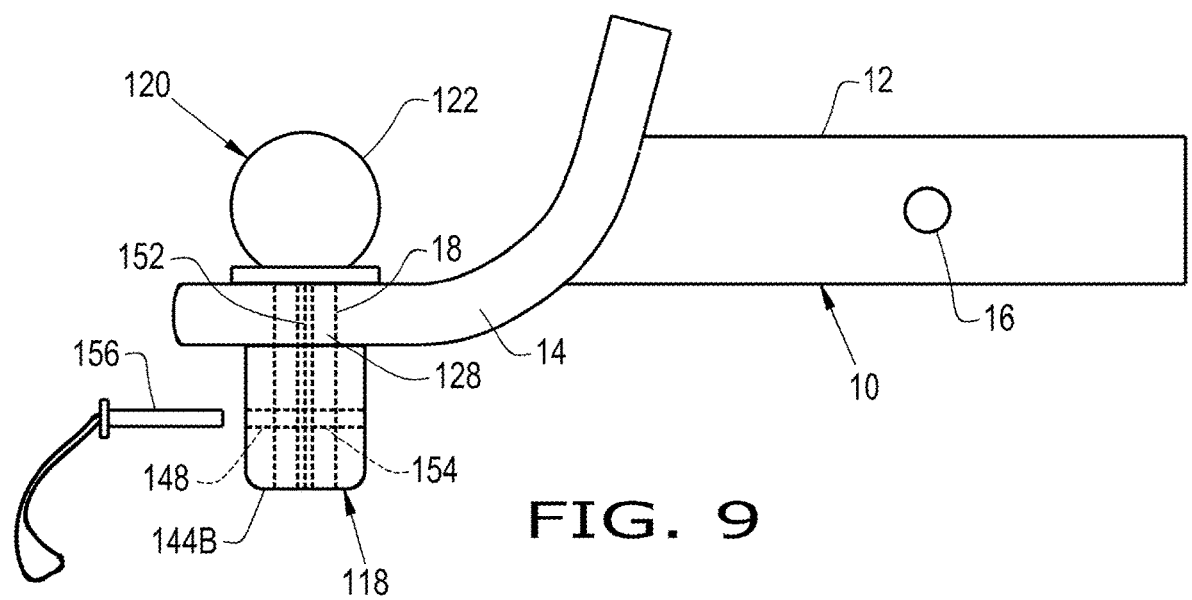
FIG. 9 is a side elevation view of the trailer hitch assembly of FIG. 8 with the mounting connection operatively assembled with the trailer coupling device of FIG. 5 and the trailer hitch mount device of FIG. 1.
Figure 10:
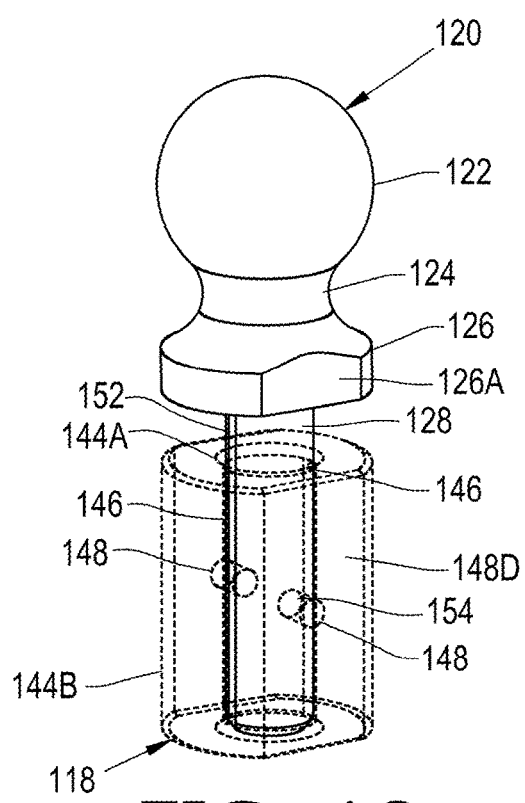
FIG. 10 is an isometric view of the trailer coupling device of FIG. 5 disposed in the mounting connection of FIG. 8 with the mounting connection shown in phantom for ease of seeing otherwise hidden features.

FIGS. 8 through 10 illustrate another example embodiment of a trailer hitch assembly, in which the mounting connection 118 and its cylindrical body 144B may be separately fabricated and then assembled with the platform 14, as previously noted. In this embodiment, the mounting connection 118 is formed essentially of only the cylindrical body 144B. Unlike the embodiment of FIGS. 2 through 4, the mounting connection 118 in this embodiment is separate from and not fixedly attached to the platform 14, that is, it is not integrally incorporated as a part of the platform 14. FIGS. 8 and 9 illustrate the mounting connection 118 of this embodiment operatively assembled with the platform 14 of the conventional mount device 10 of FIG. 1 by aligning the bore 144C of the cylindrical body 144B with the hole 18 in the platform 14 and abutting the upper end of the cylindrical body 144B (in which the opening 144A is formed) against the lower surface 14A of the platform 14, and then securing the cylindrical body 144A to the platform 14 with the trailer coupling device 120. In this embodiment, no modifications are required of the mount device 10 are required and the mounting connection 118 and trailer coupling device 120 may be able to rotate in unison within the hole 18 in the platform 14. Alternatively, the cylindrical body 144B could be fixedly attached to the lower surface 14A of the platform 114 beneath the opening 18, for example with a weld or other type of permanent coupling. In this arrangement, the hole 18 through the platform 14 does not include the protuberances 146, but rather has a substantially smooth inner surface, such as that of a substantially cylindrical through bore.

As best seen in FIGS. 8 and 10, the mounting connection 118 has a generally cylindrical body 144B with the elongated cavity 144C formed by a central through bore extending along the central axis of the cylindrical body 144B. Two radially inwardly projecting protuberances 146 in the form of V-shaped vertical ribs extending the length of the elongated cavity 144C are disposed on diametrically opposite sides of the inner surface of the elongated cavity 144C. A pair of holes 148 through opposite sides of the circumferential wall of the cylindrical body 144B are axially diametrically aligned to receive the pin 156 therethrough. The holes 148 are disposed axially along the length of the cylindrical body 144B approximately midway between the top end and the bottom end of the cylindrical body 144B, although other locations are possible. In this arrangement, the axis through the holes 148 is orthogonal to a plane defined by the two protuberances 146.

On the trailer coupling device, the recesses 152 are diametrically aligned on opposite sides of the lower stem portion 128, and the hole 154 is axially aligned along a diameter that is orthogonal to a plane define by the two recesses 152. In this way, the sliding interfit of the protuberances 146 into the recesses 152 helps ensure proper alignment of the holes 148 of the mounting connection 118 with the hole 154 of the trailer coupling device 120 when assembling the two pieces together, thereby eliminating or reducing the difficulty of aligning all three holes so that the pin 156 can be inserted therethrough. This can make it easier and faster to operatively assembly the mounting connection 118 to the trailer coupling device 120.

As best seen in FIG. 10, the outer surface of the cylindrical body 144B has a flattened portion 148D, the outer periphery of the circumferential flange 126 has a flattened surface 126A that are generally aligned with each other, for example along a common plane or parallel planes, when the hole 154 is axially aligned with the holes 148. The flattened portion 148D is generally orthogonal to the hole 148, and the plane of the flattened portion 126A is generally orthogonal to the hole 154. Optionally, a second set of complementary flattened portions 126A and 148D may also be disposed on the opposite sides of the respective circumferential flange 126 and cylindrical portion 144B, the back side as seen in FIG. 10. These flattened portions 126A and 148D can provide an additional aid to help a user rotationally align the mounting connection 118 with the trailer coupling device 120 when assembling them together by visually and/or tactilely aligning the flattened portions 126A and 148D when bringing the mounting connection and the trailer coupling device together.

As best seen in FIG. 9, to assemble the trailer hitch assembly with the trailer coupling device 120 in an operative configuration on the trailer hitch mount device 10, the lower stem portion 128 of the trailer coupling device 120 slides (downwardly) into and through the hole 18 through the platform 14 of the mount device 10. Next, the mounting connection 118 slides (upwardly) onto the portion of the lower stem portion 128 extending below the bottom surface of the platform. To do this, the lower stem portion 128 is inserted into the opening 144A of the mounting connection 118 with the protuberances 146 in the through bore 144A axially aligned with the recesses 152 on the lower stem portion 128 until the holes 148 are axially aligned with the hole 154. With the holes 148 and 154 so aligned, the pin 156 is inserted through the aligned holes 148 and 154, thereby locking the mounting connection 118 to the lower stem portion 144B of the trailer coupling device 120, which also has the effect of operatively assembling, mounting, and securing the trailer coupling device 120 to the trailer hitch mount device 10. As before, the pin 156 can further be locked into place extending through the holes 148 and 154 with a cotter pin 158 or other secondary fastener. If it later desired to remove the trailer coupling device 120 from the trailer hitch mount device 10, for example to change out to a different hitch or have no ball hitch, this process can simply be reversed. Thus, the example embodiment of FIGS. 8 through 11 provides an embodiment of the invention that can be easily retrofitted to and operatively used with the conventional trailer hitch mount device 10 without having to permanently alter the trailer hitch mount device by permanently affixing the mounting connection 118 thereto.

FIG. 11 shows a portion of another alternative of a trailer hitch assembly in which the mounting connection 118 may be placed in the existing hole 18 in the platform 14 of FIG. 1 or in an enlarged hole in a modified platform. In the nonlimiting example of FIG. 11, the cylindrical body 144B is separately fabricated and received in the hole 18 (or enlarged hole) in the platform 14, with the upper end of the cylindrical body 144B having a flange 144D that rests on the upper surface of the platform 14. In the example of FIG. 11, the flange 144D could be omitted, the cylindrical body 144B could be secured within the hole 18 (or enlarged hole) by welding, and/or the cylindrical body 144B and hole 18 (or enlarged hole) could have complementary threads such that the cylindrical body 144B is secured to the platform 14 with threads alone or in combination with a weld. Alternatively, the cylindrical body 144B could be welded to the platform 14 beneath the opening 18.

The mounting connections 118 described above provide for methods of coupling a trailer to a tow vehicle. The method may include securing the frame of the trailer hitch mount device 110 to the tow vehicle, for example, by inserting the shank 112 into the receiver tube of the trailer hitch such that the pair of holes 116 of the shank 112 align with the corresponding holes of the receiver tube of the tow vehicle. The shank 112 may then be secured with the trailer hitch pin 136.

To couple the trailer coupling device 120, the method may include aligning the central, longitudinal axis of the elongated stem of the trailer coupling device 120 with the central, longitudinal axis of the bore 144C of the mounting connection 118, and simultaneously aligning the one or more protuberances 146 extending from the interior surfaces of the mounting connection 118 into the bore 144C with the recesses 152 formed in the exterior surfaces of the elongated stem. Once all of these elements are aligned, the lower stem portion 128 of the trailer coupling device 120 may be inserted into the opening to the bore 144C of the mounting connection 118 such that the protuberances 146 are received within the recesses 152, and to an extent that the hole 154 through the elongated stem is aligned with the pair of holes 148 of the mounting connection 118.

In the embodiments represented in the drawings, this may include inserting the lower stem portion 128 of the elongated stem into the bore 144C of the mounting connection 118 until the circumferential flange 126 rests on the frame which causes the hole 154 of the lower step portion and the holes 148 of the mounting connection 118 to be aligned. The trailer coupling device 120 may then be secured with a fastener such as the trailer ball pin 156. Thereafter, the trailer may be secured to the trailer coupling device 120. Generally, this includes covering the ball 122 of the trailer coupling device 120 with the trailer coupler and locking the trailer coupler thereon. As the trailer is towed with the tow vehicle, rotation of the elongated stem is preferably restricted within the bore 144C as a result of surfaces of the recesses 152 formed in the lower stem portion 128 contacting surfaces of the protuberances 146 of the mounting connection 118.

While the invention has been described in terms of a specific or particular embodiment, it should be apparent that alternatives could be adopted by one skilled in the art. For example, the trailer hitch mount device 110 and its components could differ in appearance and construction from the embodiment described herein and shown in the figures, functions of certain components of the trailer hitch mount device 110 could be performed by components of different construction but capable of a similar (though not necessarily equivalent) function, and various materials could be used in the fabrication of the trailer hitch mount device 110 and/or its components. Accordingly, it should be understood that the invention is not necessarily limited to any embodiment described herein.

The invention claimed is:

1. A trailer hitch assembly, comprising:
   trailer hitch mount device comprising a frame configured to be secured to a tow vehicle;
   a mounting connection associated with the frame that includes a body with a bore therethrough having a central, longitudinal axis, at least one opening to the bore at an upper end of the body, a pair of aligned holes on opposite sides of the body, and one or more protuberances that protrude from interior surfaces of the body into the bore and extend within the bore in a direction parallel to the longitudinal axis of the bore; and
   a trailer coupling device configured to be secured to a trailer that includes an elongated stem having one or more recesses formed in exterior surfaces thereof that extend along the elongated stem in a direction parallel to the longitudinal axis of the elongated stem, and a hole through a diameter of the elongated stem having openings on opposite sides thereof;
   wherein the elongated stem is configured to be received within the bore of the mounting connection such that the one or more protuberances of the mounting connection are aligned with and received within the one or more recesses of the elongated stem and the holes of the mounting connection are aligned with the hole in the elongated stem;
   a fastener configured to be inserted into a first of the holes of the mounting connection, through the hole of the elongated stem, and out of a second of the holes of the mounting connection while the elongated stem is received in the bore to secure the trailer coupling device relative to the mounting connection in a direction parallel to the longitudinal axis of the bore;
   wherein the one or more protuberances of the mounting connection act as barriers on the recesses of the elongated stem and thereby prevent the elongated stem from rotating within the bore of the mounting connection about the longitudinal axis thereof.

2. The trailer hitch assembly of claim 1, wherein the bore is cylindrical except for the one or more protuberances and the stem of the trailer coupling devices is cylindrical except for the one or more recesses.

3. The trailer hitch assembly of claim 1, wherein the frame comprises:
   a shank configured to be coupled to a receiver-type trailer hitch; and
   a platform extending from the shank that includes the mounting connection.

4. The trailer hitch assembly of claim 1, wherein the trailer hitch mount device is a trailer hitch ball mount and the trailer coupling device is a trailer ball that includes a spherical body configured to mate with a trailer coupler.

5. The trailer hitch assembly of claim 4, wherein the elongated stem extends from the spherical body and comprises:
   an upper stem portion adjacent the spherical body;
   a circumferential flange adjacent the upper stem portion; and
   a lower stem portion extending from the circumferential flange;
   wherein the lower stem portion includes the one or more recesses and the hole therethrough; and
   wherein the lower stem portion is configured to be located within the bore to an extent such that the circumferential flange rests on the platform.

6. The trailer hitch assembly of claim 1, wherein the fastener is a trailer hitch pin comprising a secondary fastener configured to secure the fastener within the hole of the elongated stem and the holes of the mounting connection.

7. The trailer hitch assembly of claim 1, wherein the one or more protuberances define elongated ribs having V-shaped cross-sections and the one or more recesses device elongated valleys having V-shaped cross-sections.

8. The trailer hitch assembly of claim 1, wherein the mounting connection includes two of the one or more protuberances on opposite sides of the bore and the trailer coupling device includes two of the one or more recesses on opposite sides of the elongated stem, and wherein inserting the elongated stem into the bore such that the two protuberances mate with the two recesses causes the hole of the elongated stem and the holes of the mounting connection to be aligned.

9. The trailer hitch assembly of claim 8, wherein a central, longitudinal axis of the hole of the elongated stem is perpendicular to a geometric line or plane extending between the two recesses.

10. The trailer hitch assembly of claim 1, wherein the body of the mounting connection is an integral feature of the frame.

11. The trailer hitch assembly of claim 1, wherein the body of the mounting connection is separately fabricated from the frame and aligned with a through-hole in the frame.

12. The trailer hitch assembly of claim 11, wherein the upper end of the cylindrical body is abutted against a lower surface of the frame and secured to the frame with the trailer coupling device.

13. A method for coupling a trailer to a tow vehicle, the method comprising:
   securing a frame of a trailer hitch mount device to the tow vehicle;
   aligning a central, longitudinal axis of an elongated stem of a trailer coupling device with a central, longitudinal axis of a bore of a mounting connection associated with the frame;
   aligning one or more protuberances extending from interior surfaces of the mounting connection into the bore with one or more recesses formed in exterior surfaces of the elongated stem;
   inserting the elongated stem of the trailer coupling device into an opening to the bore of the mounting connection such that the one or more protuberances of the mounting connection are received within the one or more recesses of the elongated stem;
   continuing to insert the elongated stem into the bore until a hole through a diameter of the elongated stem having openings on opposite sides thereof is aligned with a pair of aligned holes on opposite sides of the mounting connection;
   inserting a fastener into a first of the holes of the mounting connection, through the hole of the elongated stem, and out of a second of the holes of the mounting connection;
   coupling a trailer to the trailer coupling device; and
   restricting rotation of the elongated stem within the bore by contacting surfaces of the elongated stem that define the one or more recesses with the one or more protuberances of the mounting connection.

14. The method of claim 13, wherein securing the frame of the trailer hitch mount device to the tow vehicle comprises coupling a shank of the frame to a receiver-type trailer hitch of the tow vehicle.

15. The method of claim 13, wherein the trailer hitch mount device is a trailer hitch ball mount and the trailer coupling device is a trailer ball that includes a spherical body, wherein coupling the trailer to the trailer coupling device includes coupling a trailer coupler to the spherical body.

16. The method of claim 13, wherein the elongated stem extends from the spherical body and comprises an upper stem portion adjacent the spherical body, a circumferential flange adjacent the upper stem portion, and a lower stem portion extending from the circumferential flange, wherein the elongated stem is inserted into the bore until the circumferential flange rests on the frame.

17. The method of claim 13, wherein the fastener is a trailer hitch pin, the method further comprising securing the trailer hitch pin with a secondary fastener.

18. The method of claim 13, wherein the one or more protuberances define elongated ribs having V-shaped cross-sections and the one or more recesses device elongated valleys having V-shaped cross-sections, wherein the one or more protuberances are received within and slide through the one or more recesses when the elongated stem is inserted into the bore.

19. The method of claim 13, wherein the mounting connection includes two of the one or more protuberances on opposite sides of the bore and the trailer coupling device includes two of the one or more recesses on opposite sides of the elongated stem, wherein inserting the elongated stem into the bore such that the two protuberances mate with the two recesses causes the hole of the elongated stem and the holes of the mounting connection to be aligned.

20. The method of claim 13, wherein the body of the mounting connection is separately fabricated from the frame and aligned with a through-hole in the frame, the method further comprising:
   abutting an upper end of the cylindrical body against a lower surface of the frame; and securing the cylindrical body to the frame with the trailer coupling device.

\* \* \* \* \*